United States Patent
Meerdink et al.

(10) Patent No.: US 11,950,602 B2
(45) Date of Patent: Apr. 9, 2024

(54) OVERHANG RAIL TRANSPORT SYSTEM

(71) Applicant: MAREL MEAT B.V., Boxmeer (NL)

(72) Inventors: Jan Meerdink, Boxmeer (NL); Franciscus Theodorus Henricus Johannes Van Der Steen, Boxmeer (NL); Adriaan Ebergen, Boxmeer (NL); Ronald Kranenbarg, Boxmeer (NL); Cornelis Joannes Janssen, Boxmeer (NL); Bastiaan Martinus Cornelis Albers, Boxmeer (NL)

(73) Assignee: MAREL MEAT B.V., Boxmeer (NL)

(*) Notice: Subject to any disclaimer, the term of this patent is extended or adjusted under 35 U.S.C. 154(b) by 0 days.

(21) Appl. No.: 18/265,782

(22) PCT Filed: Dec. 15, 2021

(86) PCT No.: PCT/NL2021/050765
§ 371 (c)(1),
(2) Date: Jun. 7, 2023

(87) PCT Pub. No.: WO2022/131914
PCT Pub. Date: Jun. 23, 2022

(65) Prior Publication Data
US 2024/0032549 A1    Feb. 1, 2024

(30) Foreign Application Priority Data

Dec. 18, 2020 (NL) .................................. 2027151

(51) Int. Cl.
*A22C 17/00* (2006.01)
*A22B 7/00* (2006.01)

(52) U.S. Cl.
CPC .......... *A22C 17/0093* (2013.01); *A22B 7/005* (2013.01)

(58) Field of Classification Search
CPC .. A22B 7/005; A22C 21/0053; B65G 47/683; B65G 47/61
(Continued)

(56) References Cited

U.S. PATENT DOCUMENTS 3,077,997 A * 2/1963 Toennies ................ A22B 7/005
414/373
4,838,036 A * 6/1989 Norrie .................... A22B 7/005
452/187
(Continued)

FOREIGN PATENT DOCUMENTS

DE    1035005 B    7/1958
EP    1152664 B1   5/2006
(Continued)

OTHER PUBLICATIONS

Dutch Search Report from corresponding Dutch Patent Application No. NL2027151, dated Sep. 7, 2021.
(Continued)

*Primary Examiner* — Richard T Price, Jr.
(74) *Attorney, Agent, or Firm* — Workman Nydegger

(57) ABSTRACT

A system and a method for automatic transfer of a carcass or carcass parts suspended from a first carrier to being suspended from a second carrier where at least one of the carriers is tilted at least during a part of the transfer. The carcass parts may be a half carcass that may have been eviscerated and cleaned. The first carrier may be an industry standard gambrel or a single carrier, for example a Euro Hook or a modified Euro Hook. The second carrier may be a single carrier, for example a Euro Hook, or a modified Euro Hook carrier.

15 Claims, 15 Drawing Sheets

(58) Field of Classification Search
USPC .......................................................... 452/178
See application file for complete search history.

(56) References Cited

U.S. PATENT DOCUMENTS

| | | | |
|---|---|---|---|
| 9,004,988 B2* | 4/2015 | Van Der Steen | A22B 7/005 452/125 |
| 2012/0315834 A1 | 12/2012 | Van Der Steen et al. | |

FOREIGN PATENT DOCUMENTS

| | | |
|---|---|---|
| FR | 2662582 A1 | 12/1991 |
| GB | 2025883 A | 1/1980 |
| GB | 2079712 A | 1/1982 |
| GB | 2464600 A | 4/2010 |
| WO | 2005099459 A1 | 10/2005 |
| WO | 2014007607 A1 | 1/2014 |
| WO | 2020225152 A1 | 11/2020 |

OTHER PUBLICATIONS

International Search Report from corresponding PCT Patent Application No. PCT/NL2021/050765, dated Mar. 1, 2022.

\* cited by examiner

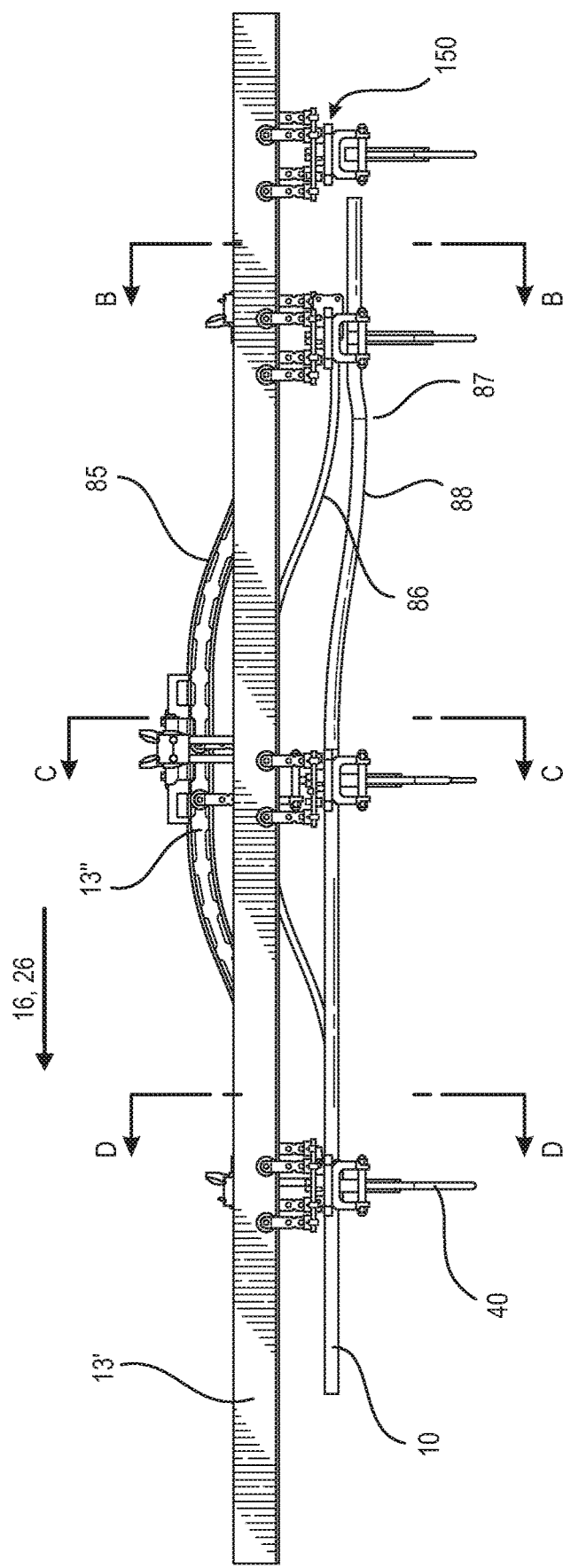

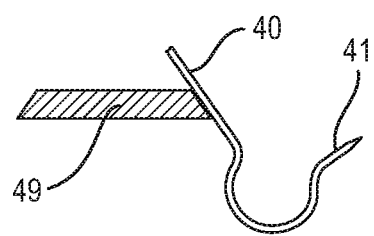
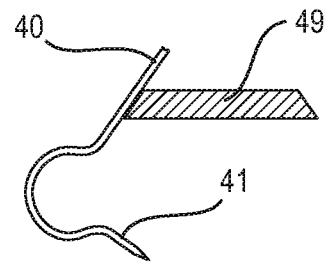
FIG. 13a  FIG. 13b
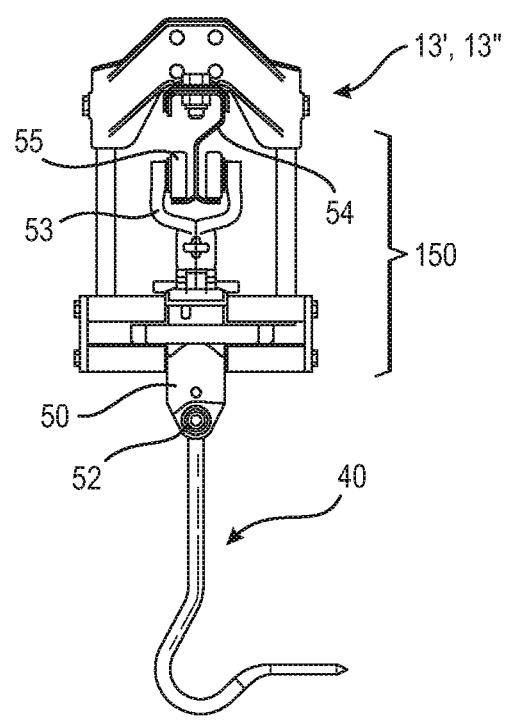
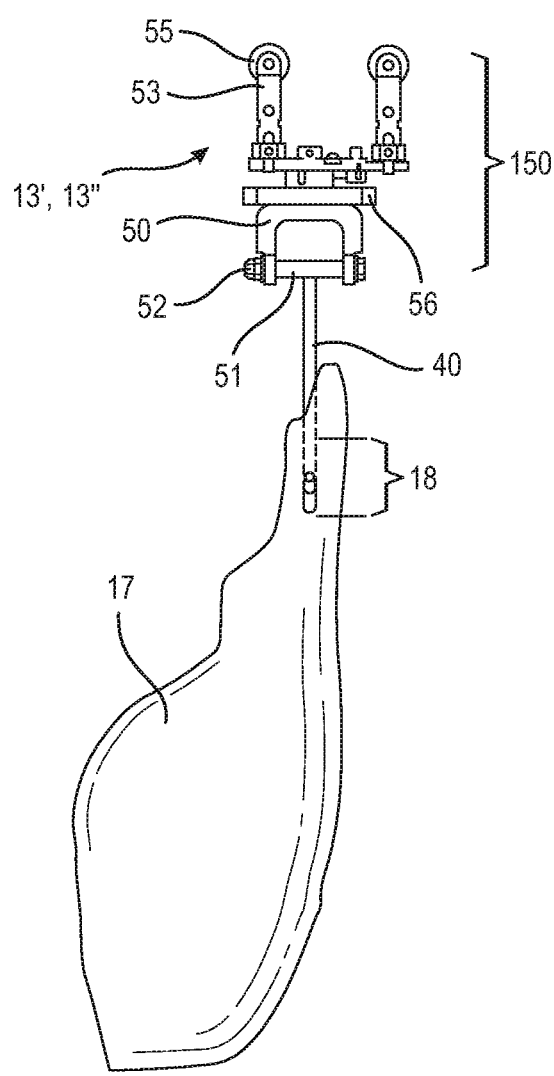
FIG. 14  FIG. 15

OVERHANG RAIL TRANSPORT SYSTEM

FIELD OF THE INVENTION

The present invention relates to the transport of four-legged slaughter animal carcass or carcass parts hanging suspended from carriers engaging in openings in leg portions of the carcass or carcass parts. More particularly, it relates to the transfer of a carcass part from one carrier to another carrier.

BACKGROUND OF THE INVENTION

It is known to transport slaughter animal carcass parts hanging suspended from carriers engaging in openings in leg portions of the carcass parts. The carcass parts may be a half carcass that has been eviscerated and cleaned. The carriers used may be of the gambrel type, having two opposed carrier ends pointing away from each other and being tied together with a cross bar. The cross bar has a hanging arrangement that cooperates with an overhead transport conveyor system. Another type of carrier may be the Euro Hook variant, aka Euro Carrier, having a pointed end and a carrier portion shaped like a fishing carrier. The Euro Hook also has a hanging arrangement that cooperates with an overhead transport conveyor system similar to that used for gambrels. The single carriers may comply with DIN 5047 (Carriers for meat and other food; tubular track sliding carrier).

For example, EP1152664B1 (Butina APS) discloses transferring half pig carcasses hanging from each end of a gambrel engaging in first openings in the carcasses whereafter a suspension means, e.g. a single carrier, is attached to engage the calcaneal tendon, thus a second opening in the carcasses as is shown in FIG. 5 of EP1152664B1. The gambrel is then removed from the first openings and each carcass half is transported separately away for deboning and other processing. This process is labour intensive, putting a maximum limit on the throughput speed of the system.

WO2005/099459A1 (K.J. Maskinfabriken A/S) discloses transferring half carcasses, hanging from carriers of an overhead conveyor, to a horizontal conveyor belt by temporarily gripping and holding the carcass sides, cutting the sinews through and cutting the hind foot/toe to release the rest of the carcass onto the belt. This, and variations on this technology, is common in the industry, but has the disadvantage that the further deboning has to take place on a horizontal surface with heavy lifts for operators and limited opportunities for automation of processes.

SUMMARY OF THE INVENTION

One object of the invention is to provide a system and a method for automatic transfer of carcass parts suspended from a first carrier to being suspended from a second carrier. The carcass parts may be a half carcass, e.g. from pig, that may have been eviscerated and cleaned. In this patent application, the term "carcass part" is also used for a whole animal carcass. The first carrier may be an industry standard gambrel having two opposed carrier ends pointing away from each other and being tied together with a cross bar or a single carrier, for example a Euro Hook. The second carrier may be a single carrier, for example a Euro Hook. With this system and method, it can be realised to transfer two carcass parts suspended from a gambrel to two single carriers that are either part of the same deboning line or where each single carrier is part of separate deboning lines. Similarly, a transfer of a carcass part from one single carrier to another single carrier may be realized, for example for classifying purposes or diversion to a cooling facility away from the current processing line.

Embodiments of the invention preferably seek to mitigate, alleviate or eliminate one or more of the above-mentioned disadvantages singly or in any combination. In particular, it may be seen as an object of embodiments of the present invention to provide an overhang rail system that solves the above-mentioned problems, or other problems, of the prior art.

To address one or more of these concerns, in a first aspect of the invention an overhang rail transport system is provided comprising a first carrier being transported by a first overhead conveyor in a transport direction and having a first carcass engaging portion, the first carrier being arranged to selectively carry a carcass part by engaging the carcass part with the first carcass engaging portion, a second carrier being transported by a second overhead conveyor and having a second carcass engaging portion, the second carrier being arranged to selectively carry a carcass part by engaging the carcass part with the second carcass engaging portion, a vertical aligning device to align the first carcass engaging portion and the second carcass engaging portion in a vertical direction, a horizontal aligning device to align the first carcass engaging portion and the second carcass engaging portion in a horizontal direction, so that both the first carcass engaging portion and the second carcass engaging portion simultaneously engage the carcass part, a tilting device to tilt the first carcass engaging portion downwards, so that the weight of the carcass part is gradually transferred from the first carcass engaging portion to the second carcass engaging portion, and a removing device to remove the first carcass engaging portion completely from engagement with the carcass part.

The overhang rail transport system may further comprise a first processing section having multiple spaced apart first carriers for conveying carcass parts of a four legged slaughter animal, where each of the first carriers has a free end designed to extend through an opening in a leg part of the carcass parts causing the carcass parts to be at least freely hanging, and at least one second processing section having multiple spaced apart second carriers where each of the second carriers has a free end designed to engage with the leg part of the carcass parts causing the carcass part to be at least freely hanging.

The overhang rail transport system may further have a transfer zone, positioned between the first processing section and the at least one second processing section, and a control device for automatically controlling the movement of the first and the second carriers so that upon arrival at the transfer zone the first and the second carriers are synchronized in movement such that the first carrier moves in a first direction carrying a carcass part through an opening arranged in the leg part and at least one empty second carrier moving in a second direction meet with their respective free ends facing each other. Multiple second processing sections may form corresponding multiple transfer zones of the overhang rail transport system, to direct carcass parts from the first carriers to selected second carriers of any of the multiple processing sections. In this way, carcass parts may be classified into different processing lines, for instance. The transfer zone is in one embodiment designed such that during movement of the first and the second carriers:

the relative horizontal distance between the free end of the first carrier and the free end of the second carrier decreases until the second carrier engages with the carcass part, followed by the weight of the carcass part load being transferred from the first carrier to the second carrier.

The at least one second processing section may include a second processing section comprising second type of carriers, a third processing section comprising third type of carriers etc., where each processing section may have different processing steps, e.g. one may be a first type of deboning line, another one may be a second type of deboning line, the third may be a cooling section acting as a buffer etc.

In one embodiment, the transfer zone is further designed so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier. Thus, a simple solution is provided to allow the first and the second carriers to engage with the carcass part via the opening in the leg part. The largest diameter or the height of the opening may vary but is commonly few centimeters. The difference in the height level is selected such that it is within the height of the opening.

In another embodiment, the transfer zone is further designed so the relative height level distance between the free end of the first carrier and the free end of the second carrier changes until the height level of the free end of the second carrier is above the height level of the first carrier causing the weight transfer of the carcass part load to the second carrier.

In one embodiment, the overhang rail system may further comprise a guiding device, subsequent to the transfer of the carcass part to the second carrier, to tilt the first carrier and guide the first carrier and/or the carcass part away from the second carrier resulting in that the second carrier being the sole carrier for the carcass part.

In one embodiment, the overhang rail system further may have a guiding device, subsequent to the transfer of the carcass part to the second carrier, to guide the first carrier and/or the carcass part away from the second carrier resulting in that the second carrier becomes the sole carrier for the carcass part.

Further, the guiding device may have an elongated guiding member arranged relative to the first and second carriers such that the elongated guiding member, e.g. a rod or similar, interacts with the first carrier and/or the carcass part while the first carrier moves in the first direction, the interaction forcing an increase in the relative horizontal distance between the first carrier and the second carrier until a complete separation of the first carrier from the opening in the leg part.

The first carrier may be slideably attached to a first rail guide and the second carrier may be slideably attached to a second rail guide, where the transfer zone is defined via the arrangement of the first and/or the second rail guide causing the change in the relative horizontal distance between the free end of the first carrier and of the free end of the second carrier, and causing the change in the relative height level distance between the free end of the first carrier and the free end of the second carrier.

The first carrier may be a gambrel like structure comprising free ends at its opposite ends, where each of the opposite ends carries a carcass part, where the at least one second processing section includes two second processing sections, where the synchronized movement occurs at the opposite ends of the gambrel where empty free ends of second carriers penetrate, e.g. simultaneously, into the respective opening at the leg parts of the carcass parts. Thus, it is now possible to automatically transfer the carcass parts, which may be half carcasses, to the second carriers associated with a second and third processing sections without any manual labour, where the processing steps at the second and third processing sections may include, but is not limited to, be cooling (temporal storage as an example), at least partly deboning of the carcass part by e.g. manual labour and/or processing devices.

The carcass part may initially be transferred from one side of the gambrel while the other side of the gambrel is temporarily supported by the second carrier.

In one embodiment, the overhang rail transport system further comprises guide arrangements comprising multiple of guides configured to stabilize and raise or lower one or more of the carcass engaging portions of the gambrel (free ends of the gambrel) during the movement of the gambrel in the transport direction.

In an embodiment, the guide arrangement comprises first bottom guide, generally shaped to follow a bottom contour of the gambrel, utilized for either stabilizing the gambrel from movement in a rotating direction about a conveying device to which the gambrel is slideably attached to and/or to raise one of the gambrel free ends in a vertical direction (and lower the opposite free end of the gambrel a corresponding distance).

In another embodiment, guide arrangement may further comprise a first top guide, to be used to stabilize the gambrel from movement in a rotating direction about the transport direction Similarly, a second top guide may be provided and configured to be used to stabilize the gambrel from movement in a rotating direction about the gambrel conveying device. Bottom guides may further be provided designed to have a profile in the travel direction of the gambrel. For example, the guide profile may be lower at an entrance portion of the guides and gradually be raised to a higher profile to push the gambrel upwards by tilting the gambrel backwards and upwards towards the gambrel conveying device. In this way, the vertical position of the free ends of the gambrel may be varied with respect to the conveying device depending upon where the gambrel is situated along the profile of the guides.

The first carrier may comprise a single hook, more specifically a Euro Hook. The single hook may comply with DIN 5047. In a further embodiment, the first carrier may be identical to the second carrier.

Accordingly, an overhang rail system is provided that is capable of fully automatically performing a re-shackling of a carcass part from the first shackle type to the at least one second shackle type without any manual labour. The term carcass part may according to the present invention should be understood as, but not limited to, a half pig carcass. Moreover, the overhang rail system facilitates deboning and other processes since e.g. such a half pig can weigh well over 40 kg and will therefore be difficult to handle when the carcasses are lying on horizontal transport conveyors. A hanging carcass requires much less effort to manipulate by an operator. Moreover, the overall yield of the deboning may be increased significantly since e.g. no sawing operation is needed. Thus, as an example, the removal of the ribs e.g. in case the carcass part is half a pig, may be done manually so that the resulting ribs may contain the overall ribs from rib number 4 and onwards, i.e. a larger rib part, instead of where commonly, the removal of the ribs requires a sawing operations where from e.g. ribs number 5/6 throughout ribs 7-9 (as an example), which leaves sharp rib edges at the end of the ribs, and saw dust, which makes the resulting rib product less attractive towards customers and thus less valuable. Another example of an advantage of now being able to process (e.g. debone) such a half carcass is that the complete loin may be removed from the carcass part, commonly today, the middle part of the half carcass is removed via a sawing operation from the leg part leaving a part of the loin in the leg part which is less valuable than the loin.

Further, such an automatic transfer of a carcass part from one carrier, belonging to one processing section, to another carrier, belonging to a second processing section, may be affected fully automatically which increases enormously the variety of the processing steps that may be chosen, by bypassing certain processing stations or choosing a certain processing line out of a selection of many processing lines for selected carcass parts.

In one embodiment, the transfer zone further comprises a support guide such as a tapered guide to interact with a rear side (i.e. the side that has no pointed end) of the first and/or the second shackle type while the second carrier engages with the carcass part and/or while the carcass part is removed from the first shackle and to the second shackle. This may e.g. be of relevance when the shackles are mounted to a rail system in a hinge like manner, thus, such support guide will prevent the shackle from swinging during the transfer of the carcass part.

According to a second aspect a method is provided for transferring a carcass part from a first carrier to a second carrier, the first carrier being transported by a first overhead conveyor and having a first carcass engaging portion, the second carrier being transported by a second overhead conveyor and having a second carcass engaging portion, the method comprising the steps of:
carrying a carcass part in the first carrier by engaging the carcass part with the first carcass engaging portion,
vertically aligning the first carcass engaging portion and the second carcass engaging portion,
horizontally aligning the first carcass engaging portion and the second carcass engaging portion, so that both the first carcass engaging portion and the second carcass engaging portion simultaneously engage the carcass part,
tilting the first carcass engaging portion downwards, so that the weight of the carcass part is gradually transferred from the first carcass engaging portion to the second carcass engaging portion, and
removing the first carcass engaging portion completely from engagement with the carcass part.

The overhang rail system may further comprise:
a first processing section comprising multiple of spaced apart first carriers for conveying carcass parts of a four-legged slaughter animal, where each of the first carriers comprises a free end designed to extend through an opening in a leg part of one of the carcass parts causing the carcass parts to be at least freely hanging,
at least one second processing section comprising multiple spaced apart second carriers where each of the second carriers comprises a free end designed to engage with the leg part of one of the carcass parts causing the carcass part to be at least freely hanging,
a transfer zone positioned between the first processing section and the at least one second processing section, wherein the method further comprises:
automatically controlling the movement of the first and the second carriers so that upon arrival at the transfer zone the first and the second carriers are synchronized in movement such that the first carrier moves in a first direction carrying the carcass part through the opening in the leg part and at least one empty second carrier moving in a second direction meet with their respective free ends facing each other, the transfer zone being designed such that during movement of the first and the second carriers the relative horizontal distance between the free end of the first carrier and the free end of the second carrier decreases until the second carrier engages with the carcass part, followed by
the weight of the carcass part load being transferred from the first carrier to the second carrier.

The first direction and the second direction may in one embodiment be parallel directions where the shackles are moving in the same directions. In another embodiment, the shackles are moving in an angular direction relative to each other, e.g. with a 90 degrees angle.

In one embodiment, the second carrier is arranged to grip around a foot of the leg of the carcass part, where the second carrier comprises two free ends being more or less parallel, where the gripping around the food may include clamping the leg of the carcass part between these two free ends.

In one embodiment, the free end of each of the second carriers is configured to extend through an opening in the leg part of the carcass parts causing the carcass part to be at least freely hanging.

In one embodiment, the method comprises designing the transfer zone so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier.

In one embodiment, the method comprises further designing the transfer zone so the relative height level distance between the free end of the first carrier and the free end of the second carrier changes until the height level of the free end of the second carrier is above the height level of the first carrier causing the weight transfer of the carcass part load to the second carrier.

In one embodiment, the method further comprises the step of guiding the first carrier away from the second carrier using a guiding device, subsequent to the transfer of the carcass part to the second carrier, resulting in that the second carrier is the sole carrier for the carcass part.

In one embodiment, the method further comprises the step of increasing the relative horizontal distance between the first carrier and the second carrier until a complete separation of the first carrier from the opening in the leg part by interacting the guiding device in the shape of an elongated guiding member arranged relative to the first and second carriers such that the elongated guiding member interacts with the first carrier and/or the carcass part while the first carrier moves in the first direction, the interaction forcing an increase in the relative horizontal distance between the first carrier and the second carrier until a complete separation of the first carrier from the opening in the leg part.

In one embodiment, the method further comprises the step of using a gambrel like structure comprising free ends at its opposite ends as the first carrier, where each of the opposite ends carries a carcass part, wherein the at least one second processing section includes two second processing sections, wherein the synchronized movement occurs at the opposite ends of the gambrel where empty free ends of second carriers penetrate into the respective opening at the leg parts of the carcass parts.

In one embodiment, the step of transferring comprises transferring the carcass part from one side of the gambrel while the other side of the gambrel is temporarily supported by the second carrier.

In one embodiment, the first and the second carriers are identical.

Accordingly, a method is provided that among other things allows fully automatization of re-shackling, e.g. from a gambrel to hooks while the carcass parts, e.g. half pig carcasses, are still hanging from an overhead position. This makes the subsequent processing much easier for an operator, e.g. deboning, trimming, compared to having carcasses lying on horizontal transport conveyors. Further, an automatic transfer of a carcass part from one carrier, belonging to one processing line, to another carrier, belonging to a second processing line, may be affected.

BRIEF DESCRIPTION OF THE DRAWINGS

Embodiments of the invention will be described, by way of example only, with reference to the drawings, in which

FIG. 2 is a schematic side view of the embodiment of FIG. 1;

FIGS. 13a and 13b are schematic side views showing an embodiment of a modified Euro hook being angled in a plane perpendicular to the conveyor transport direction;

FIG. 14 is a schematic side view showing the modified Euro hook of FIG. 7 in its overhead conveyor arrangement according to an embodiment of the invention;

FIG. 15 is a schematic end view showing the trolley portion of the modified Euro hook of FIG. 14, with a carcass part hanging from the hook;

DESCRIPTION OF EMBODIMENTS

Figure 1:
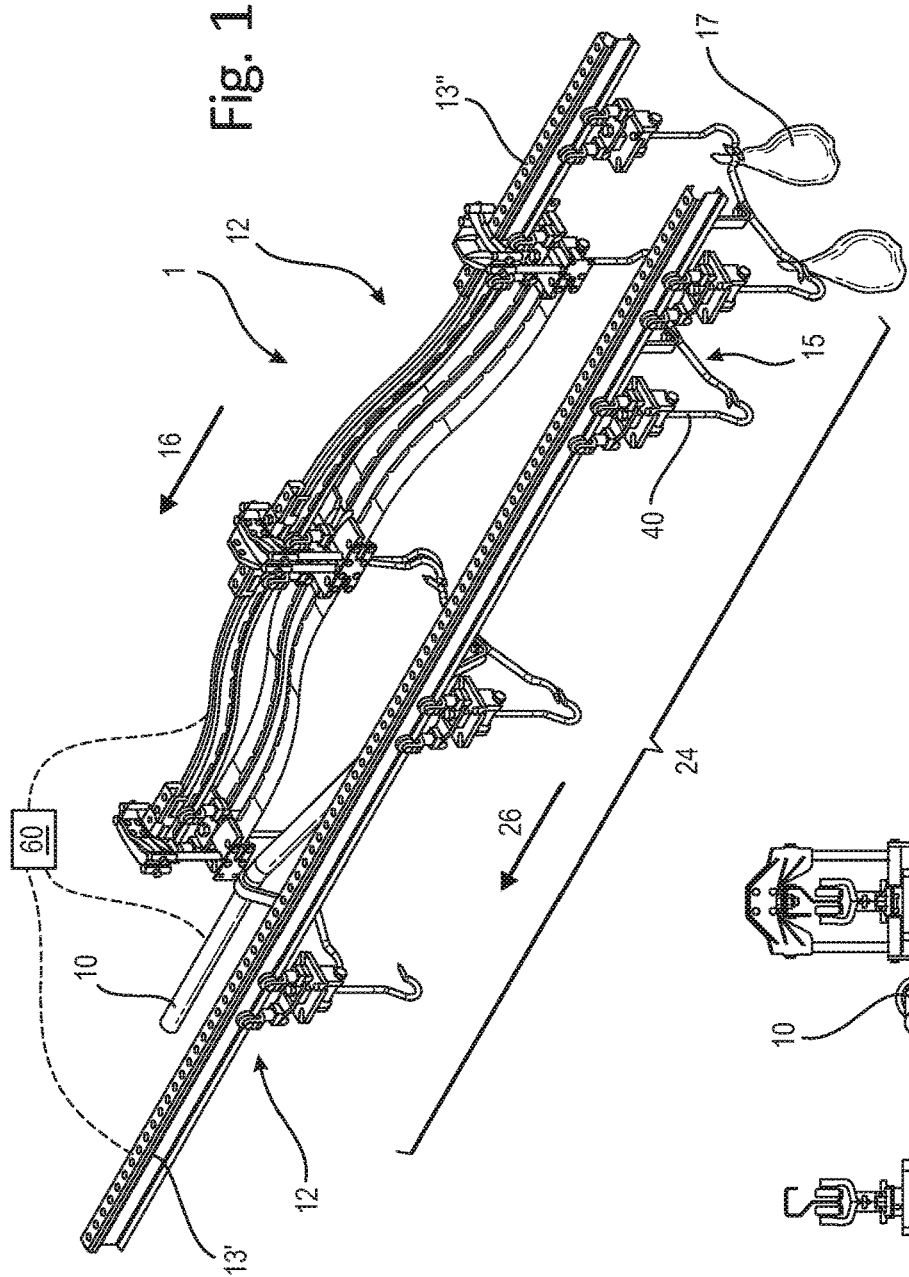
FIG. 1 is a schematic perspective view showing a gambrel to single carrier transfer system according to an embodiment of the invention.
Figure 2D:
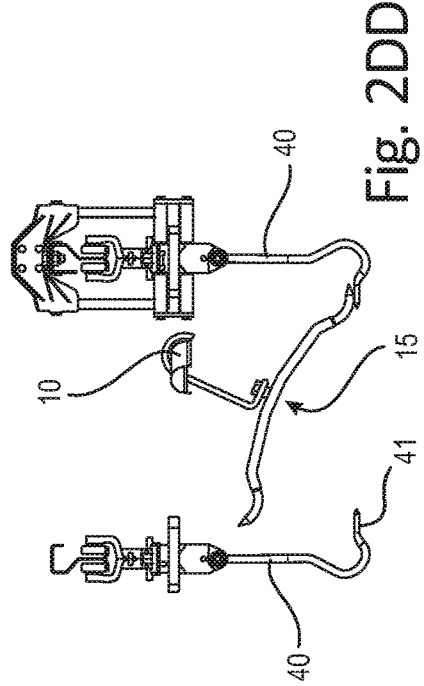
FIG. 2DD is a schematic end view of the section D-D of FIG. 2.
Figure 2B:
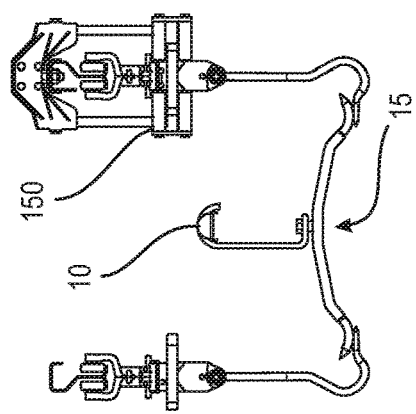
FIG. 2BB is a schematic end view of the section B-B of FIG. 2.
Figure 2C:
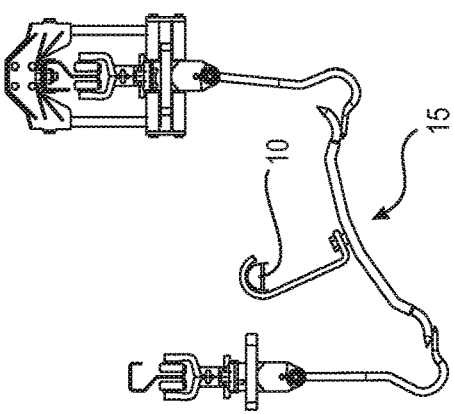
FIG. 2CC is a schematic end view of the section C-C of FIG. 2.
Figure 3:
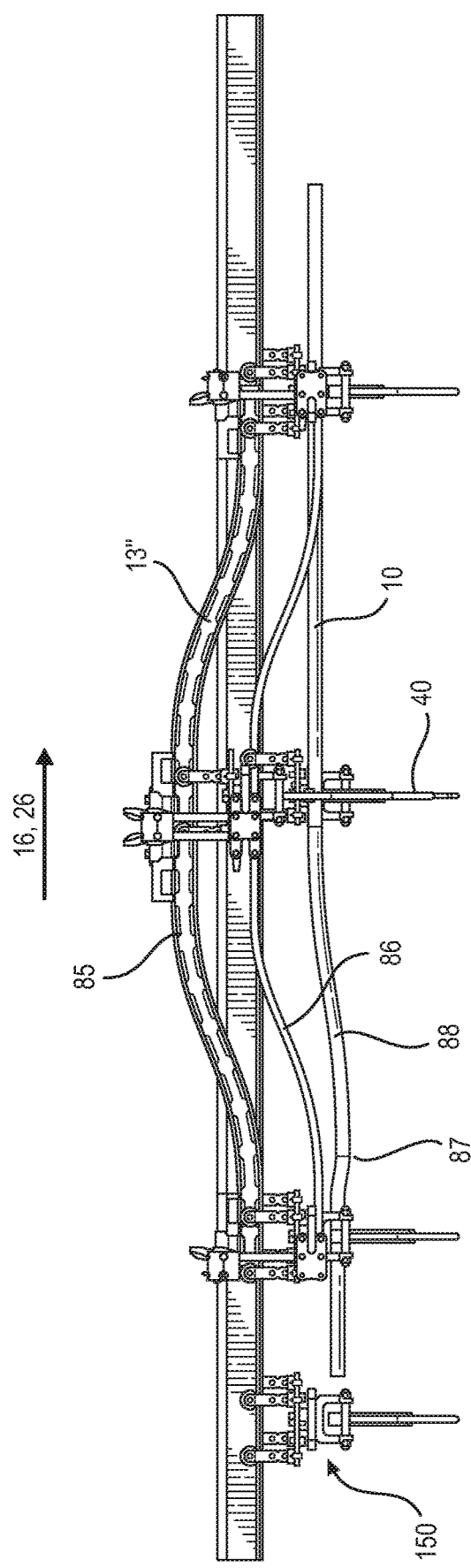
FIG. 3 is a schematic side view of the embodiment of FIG. 1 seen from the opposite side of FIG. 2.
Figure 4:
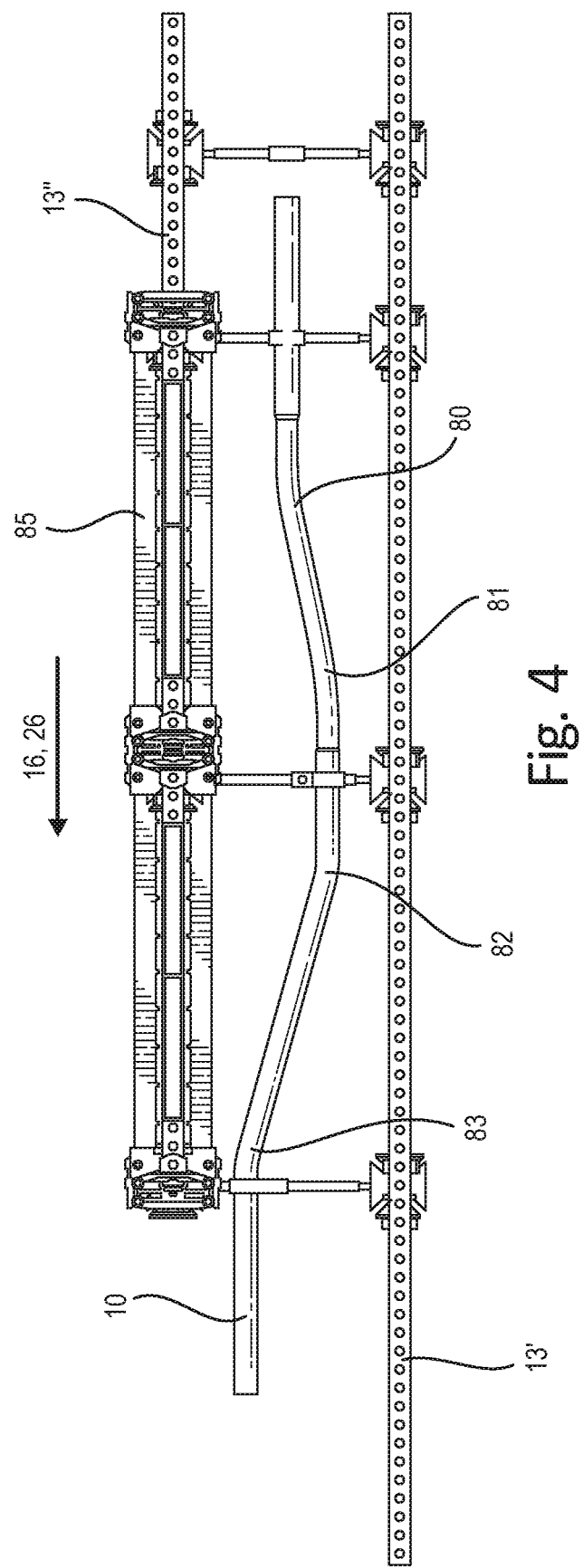
FIG. 4 is a schematic top view of FIG. 1.

Referring to FIGS. 1 to 4, including FIGS. 2BB, 2CC and 2DD, an embodiment of an overhang rail transport system 1 according to the present invention for transferring carcass parts 17 from a gambrel conveyor 10 to a single carrier transport line 12 is shown. The gambrel conveyor and the single carrier transport line are mounted to a frame (not shown). The carcass parts enter a transfer zone 24 hanging one from each free end 22 (see FIG. 5a, for details) of an individual gambrel (first carrier) 15. The carcass parts may be one right side and one left side of a slaughter animal that has been eviscerated and halved along the spine. Alternatively, the front end of the carcass part, or other carcass parts, may be removed before the gambrel transport line enters the transfer zone. One carcass part is hanging from an opening 18 (see FIG. 15) arranged in a rear leg of the slaughter animal, one of the carrier ends 22 of the gambrel 15 penetrating the opening to thereby let the carcass part hang from the gambrel. The animal head may still be attached to one of the right or left sides of the slaughter animal The carcass parts on the gambrel conveyor 10 are transported in the direction marked 16 in FIG. 1 and pass in-between two single carrier conveyors, one marked 13', shown on the left side of FIG. 1, and the other marked 13", shown on the right side of FIG. 1. The single carrier conveyors are travelling in a direction marked 26. In the transfer zone 24, direction 16 is parallel to direction 26, and both are heading the same way. The carriers (second carrier) 40 used on each single carrier conveyor may be a standard Euro hook or a modified Euro hook 40 (for details see FIGS. 7 to 10 and 18). The single carriers are mounted to the single hook conveyors 13', 13" using a trolley arrangement 150 that allows the single carriers to at least swivel in a direction transverse to the travelling direction 26. The transport system for the gambrel conveyor 10 as well as the single carrier conveyors 13', 13" may be of a known type and will not be described in detail except when changes have been made to the already known types of transport system.

The individual transport speeds of the respective conveyors 10, 13', and 13" may be set using a control system 60, which may be electrically connected to other systems (not shown) up-stream or down-stream of the transfer system 1. The control system may adjust the speed of the single carrier conveyor 13' to align the tip 41 of the single carrier 40 of this "left" single carrier conveyor to coincide with the location of the opening 18 arranged in the rear leg of the carcass part shown on the left side of FIG. 1. Simultaneously, the control system may adjust the speed of the single carrier conveyor 13" to align the tip 41 of the single carrier 40 of this "right" single carrier conveyor to coincide with the location of the opening 18 arranged in the rear leg of the carcass part shown on the right side of FIG. 1. The speed adjustments may be in the form of a retardation of one conveyor or an acceleration of one conveyor whilst keeping the speed of another conveyor constant, or combinations of these actions.

The overhang rail transport system 1 may have arrangements for varying the relative distance between carriers (first carrier or second carrier) by varying the horizontal and/or vertical distance between the conveyors. In one embodiment, the gambrel conveyor 10 may have a first vertical bend 80, a second vertical bend 81, a third vertical bend 83 and a fourth vertical bend 84 so that the relative vertical distance between the gambrel conveyor 10 and the first carrier conveyor 13' is diminished and then extended, so that, conversely, the distance between the gambrel conveyor 10 and the second carrier conveyor 13" is extended and then diminished. The second carrier conveyor 13" is made to change path vertically, having a raised portion 85 to lift the second carrier to correspond to the tilting movement of the gambrel when the gambrel conveyor runs closer to the first carrier conveyor 13'. The raised portion 85 has a corresponding raised trolley guide 86 to stabilize the vertical position of the trolley 150 in a direction parallel to the transport direction 26 of the second carrier conveyor 13". The pitch or angle of the upturn corresponds to the desired change in vertical height, marked h. Of course, a corresponding downturn would be realized in a similar way, with a downward angling segment of conveyor.

The gambrel conveyor 10 makes a downwards movement at a position 87 where a free end of the first carrier is aligned with one free end of the gambrel 15 at the same time a free end of the second carrier is aligned with the other free end of the gambrel. In this manner, the weight of the carcass part 17 is transferred from the gambrel free ends to the respective free end of the first and second carriers.

The gambrel conveyor 10 further makes an upwards movement at a position 88 synchronized with the raised portion 85 of the second carrier conveyor 13". The gambrel conveyor stays at the raised height throughout the remainder of the transfer zone 24.

Figure 5A:
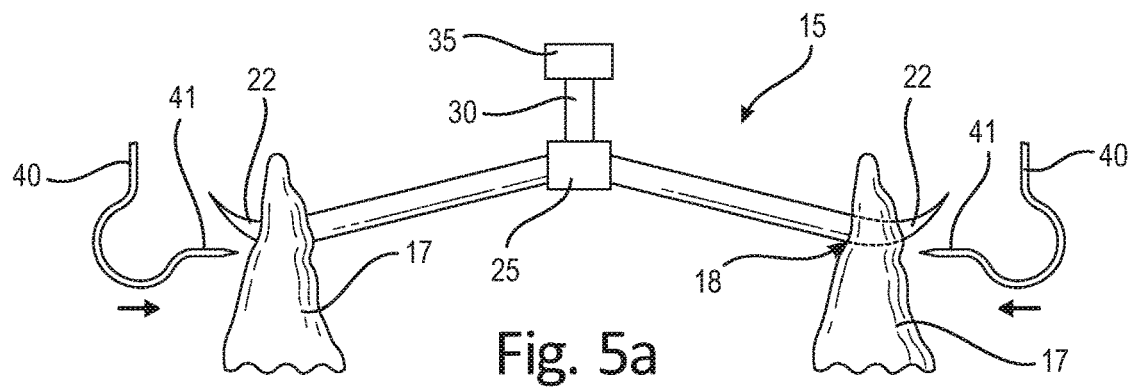
FIGS. 5a-h are schematic side views showing detailed steps of a gambrel to single carrier transfer according to an embodiment of the invention, where the free end of the single hook approaches the carcass part from the opposite side compared to where the free end of the gambrel was inserted.

An embodiment of a gambrel 15 that may be used in the transfer system 1 is shown in FIG. 5a. The gambrel is adapted to convey carcass parts 17, where each of the gambrels may have a free end 22 designed to extend through the opening 18 in the leg part of the carcass part causing the carcass part to be at least freely hanging. The gambrel 15 has a middle junction 25 that is attached to a conveying device 35 using an extension 30. The gambrel may be a standard type, as has been mentioned earlier.

Figure 7:
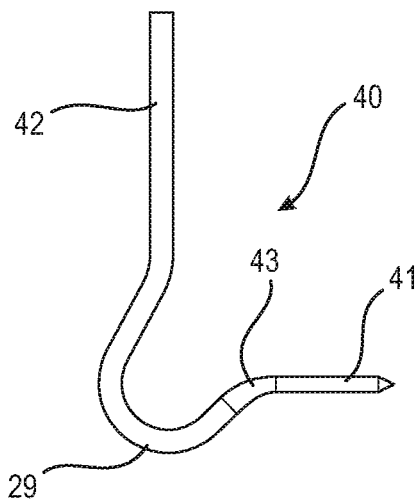
FIG. 7 is a schematic side view showing a single hook according to an embodiment of the invention.
Figure 8:
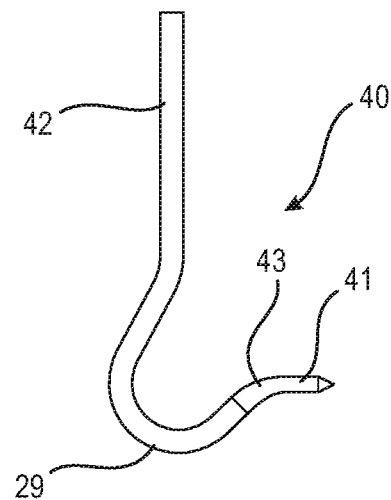
FIG. 8 is a schematic side view showing a single hook according to an embodiment of the invention.

FIGS. 7 to 10 and 18 show embodiments of single carriers 40 that may be used in the transfer system 1. As is shown in FIGS. 7 and 8, the carrier may be comparable to a standard Euro hook and may use the same conveyor system as a Euro hook, but preferably has an elongated and substantially horizontally extended tip 41. The tip may be longer (e.g. FIG. 7) or shorter (e.g. FIG. 8). A bottom part 29 of the carrier 40 is intended for the leg part of the carcass part to be resting in, such that the weight of the carcass part is substantially hanging right under a stem 42 of the carrier. The stem is connected to a conveyor propulsion connection part of the carrier that is not shown in the figures.

Figure 9:
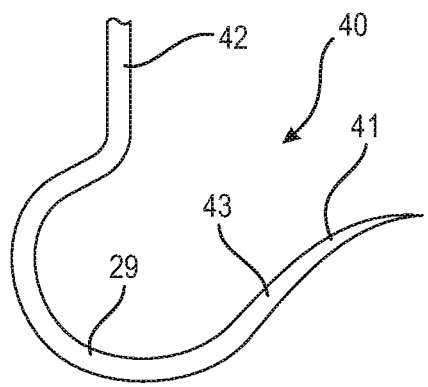
FIG. 9 is a schematic side view showing a single hook according to an embodiment of the invention.
Figure 10:
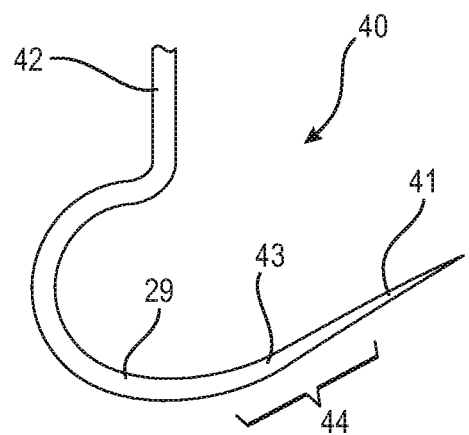
FIG. 10 is a schematic side view showing a single hook according to an embodiment of the invention.
Figure 18:
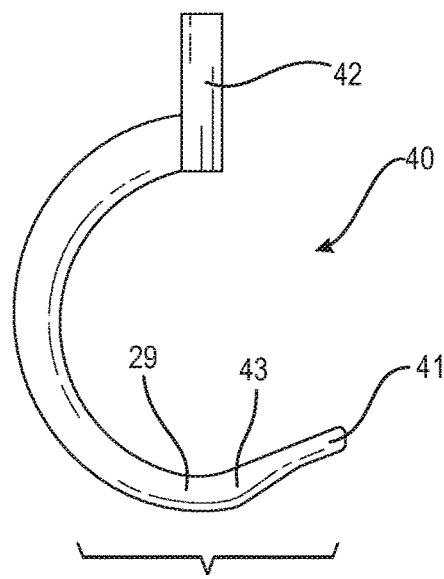
FIG. 18 is a schematic side view showing an embodiment of a single hook according to the invention.

FIGS. 9, 10 and 18 show further embodiments of single carriers 40 that may be used in the transfer system 1. The transition 43 from the curved carrier portion to the tip is gentler (smaller radius bend) and the tip itself may be pointing upwards at an angle of, for example, 20 to 45 degrees compared to the carriers shown in FIGS. 7 and 8. The carrier shown in FIG. 10 has a substantially straight transition 44 from the curved carrier portion to the tip, and the tip may be long and angled upwards.

FIGS. 14 and 15 show the carrier of FIG. 7 mounted on a trolley arrangement 150 attached to the single hook conveyor 13', 13". The trolley may be of the type disclosed in WO2014007607 A1. The carrier 40 is pivotably attached to a fork 50 via a cross-bar 51. The cross-bar is rotatably held in the fork via hinge points 52. The cross-bar rotation is about a horizontal axis. The fork is rotatably attached to a trolley slide 53. The fork rotation is about a vertical axis. The trolley slide is slidable along a conveyor rail 54, for example using rotatable wheels 55 or similar. A cam 56 having shapes corresponding to cam drives (not shown) arranged along the single hook conveyor 13', 13" may impart the rotating motion to the fork 50 at desired locations along the conveyors.

Embodiments of tilting the carrier 40 in a direction perpendicular to the single carrier conveyor transport direction 26 (see FIG. 1) are shown in FIGS. 13a and 13b. The single carrier 40 is pivotable as has been disclosed in conjunction with FIGS. 14 and 15 above. The carrier is pivotably attached to the fork 50 via the cross-bar 51. To affect a pivoting motion in the direction of the tip 41 (as shown in FIG. 13a), a tilting guide 49 cooperates with the stem 42 (see FIGS. 7 and 8, for instance) of the carrier to angle the stem of the carrier to a desired angular position with respect to the cross-bar 51. In this way, the carcass may be raised (displaced in the vertical direction as shown in FIG. 13a) simultaneously as the horizontal position of the carcass changes. An example when this is desirable is when a carcass has to slide down from the tip 41 to the bottom part 29 of the carrier 40 after a transfer.

In another embodiment, to affect a pivoting motion in the direction away from the tip 41 (as shown in FIG. 13b), a tilting guide 49 cooperates with the stem 42 of the carrier to angle the stem of the carrier to a desired angular position with respect to the cross-bar 51. In this way, the carcass may be raised (displaced in the vertical direction as shown in FIG. 13b) simultaneously as the horizontal position of the carcass changes. An example when this is desirable is when a carcass has to slide off the carrier 40 from the tip 41 to remove the carcass from the carrier. The tilting guide may be tapered to impart a gradual tilt to the carrier 40. The tilted position, in a desired angle, may be used to facilitate inserting the tip 41 into the opening of the carcass and/or removing the tip from the opening during a carcass transfer operation.

FIGS. 5a to 5h show the steps involved in de-gambreling carcass parts 17 from a gambrel 15 (first carrier) to a pair of single carriers 40 (second carrier). The gambrel and the single carriers have been described above for FIGS. 7 to 10 and 18. The gambrel conveyor 10 passes in-between two single carrier conveyors (not shown, but see description above for FIGS. 1 to 4). The individual transport speeds of the respective conveyors may be set using a control system as described earlier. The free ends 22 of the gambrel are inserted in openings 18 (see FIG. 15) in the legs of the carcass parts 17 so that the carcass parts hang freely from the gambrel free ends. The free end of the single hook 41 is inserted in the opposite direction that the free end(s) 22 of the gambrel 15 were inserted into the openings 18.

FIG. 5a shows an initial step where the location of the free ends 22 of the gambrel 15 are lined up with the tip 41 of the single carrier 40 on either side of the gambrel. The lining up may take place by adjusting the speed of either the gambrel conveyor and/or either of the single carrier conveyors. The control system may incorporate a vision system (not shown)

for detecting the position of the individual opening 18 in the carcass part. In this case, the control system uses this position information to regulate the conveyor speeds. The tip 41 of each single carrier 40 is pushed into the corresponding opening 18, for example using a tapered guide 70 (as shown in FIGS. 11b and 11c which will be described below). The weight of the carcass part 17 is held solely by the free ends 22 of the gambrel 15 at this point. The vertical position of the tip 41 is lower than the vertical position of the free ends.

Figure 5B:
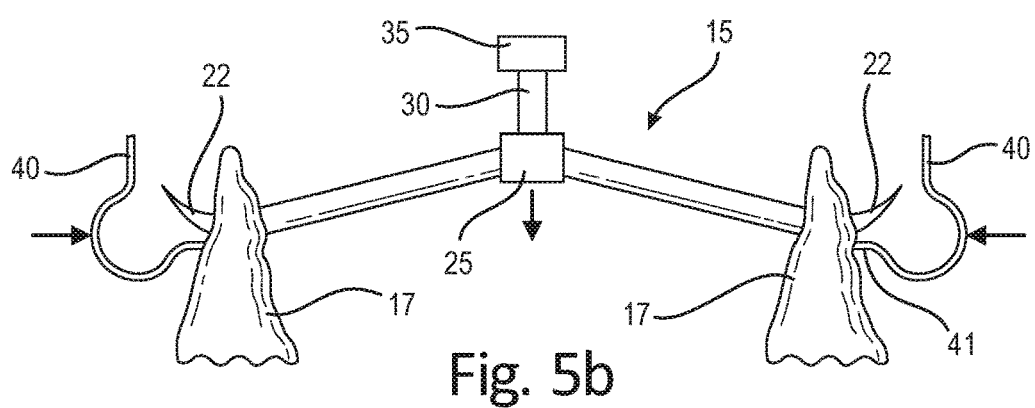
Figure 5C:
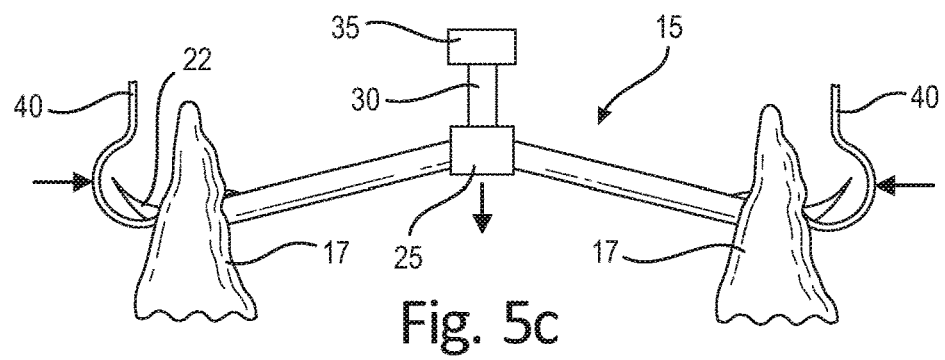
Figure 6A:
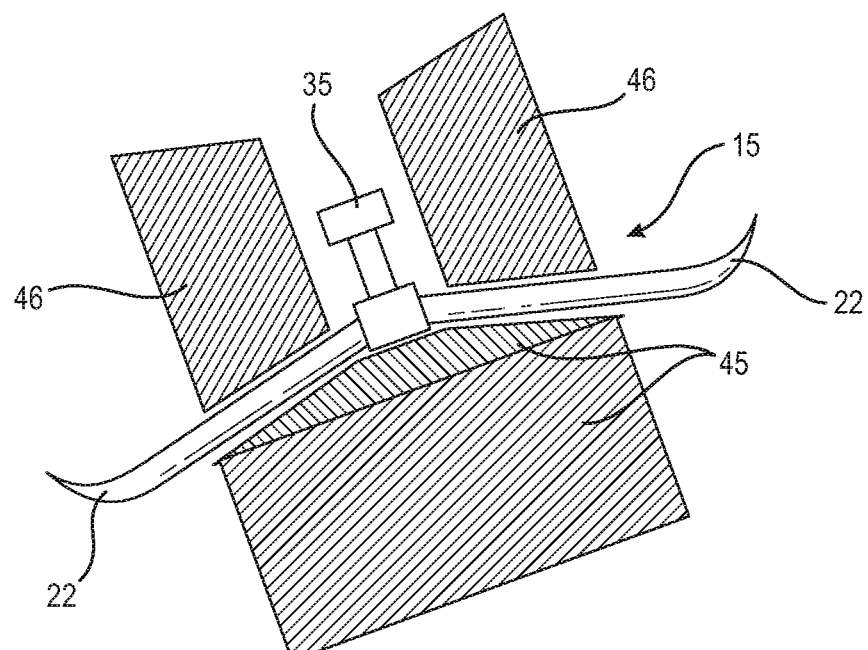
FIG. 6a is a schematic end view showing gambrel guides according to embodiments of the invention.
Figure 6B:
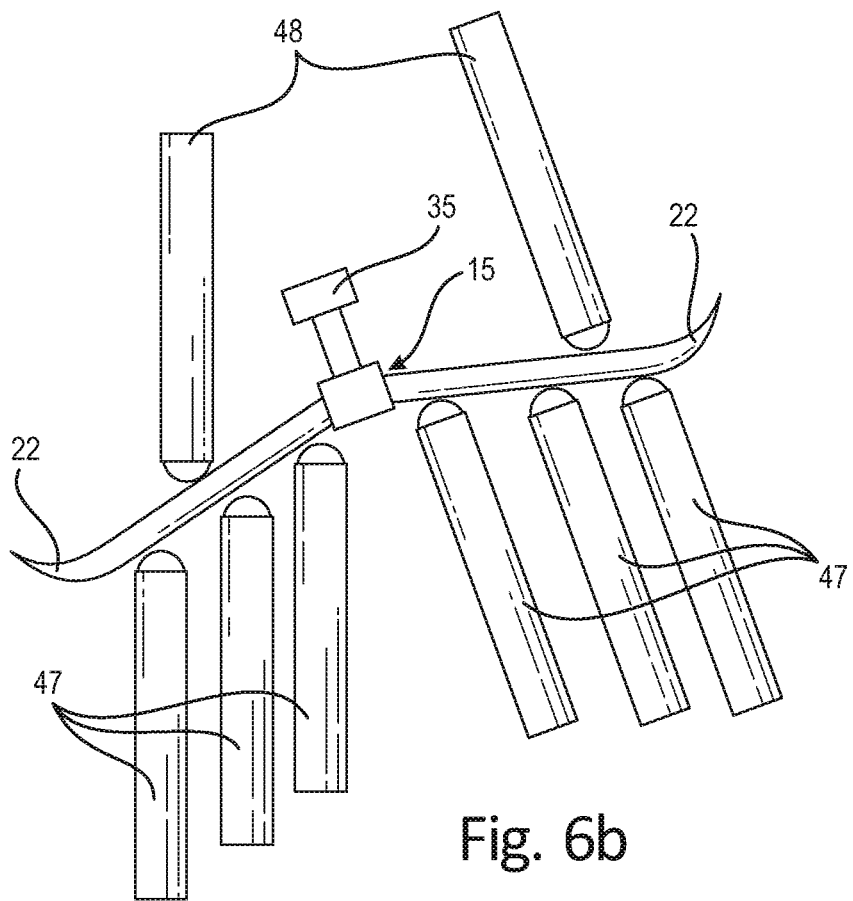
FIG. 6b is a schematic end view showing gambrel guides according to further embodiments of the invention.

In FIGS. 5b and 5c, the tip 41 of each single carrier 40 has penetrated into the respective opening 18. The vertical position of the free ends 22 is now lowered, with respect to the tips 41. This may be done by lowering the gambrel conveyor path or by utilizing guides 45, 46, 47 and/or 48 (as shown in FIGS. 6a and 6b which will be described below). The guide lifts the gambrel up to a higher vertical position in preparation for the transfer operation and gradually lowers the gambrel when the tip 41 has been inserted into the opening 18. The guides also stabilize the gambrel from swinging movement in any plane.

Figure 5D:
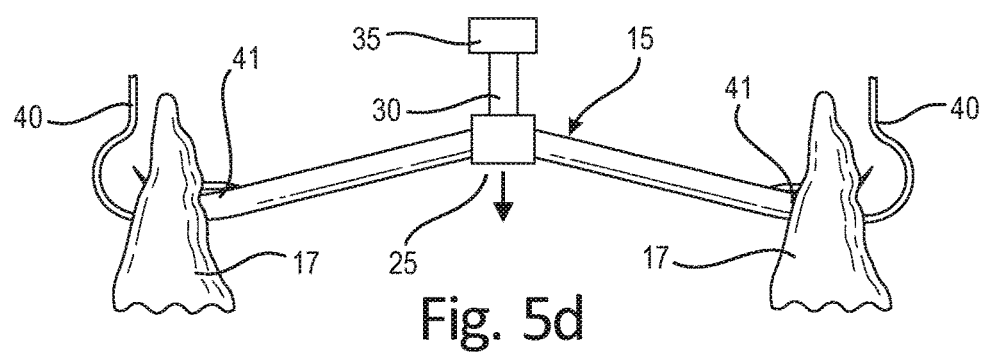

FIG. 5d shows a step where the tip 41 is fully inserted into the opening 18, the free ends 22 of the gambrel have been lowered so that the weight of the carcass part 17 fully rests on the individual single carriers 40.

Figure 5E:
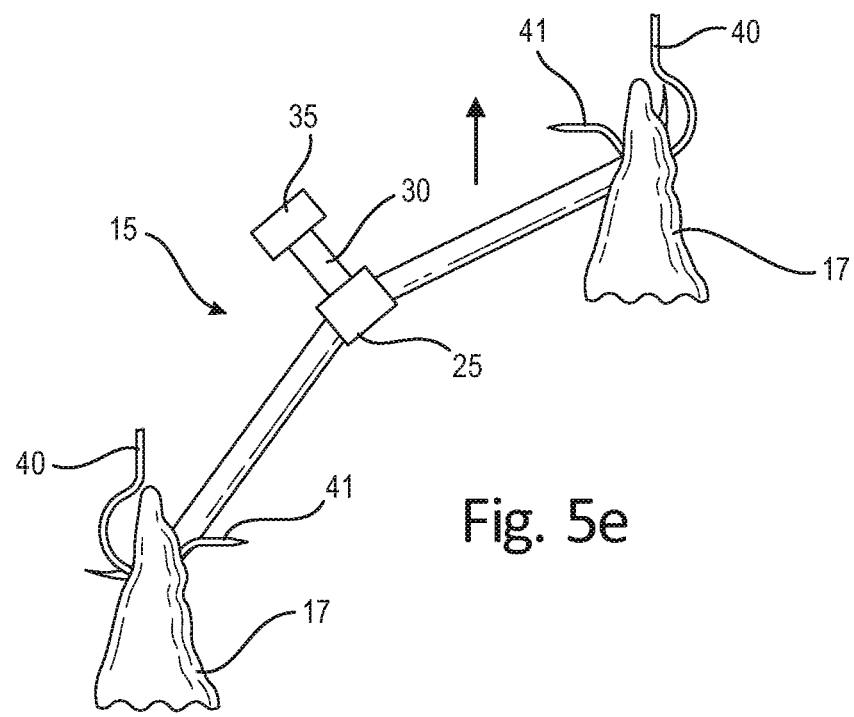
Figure 5F:
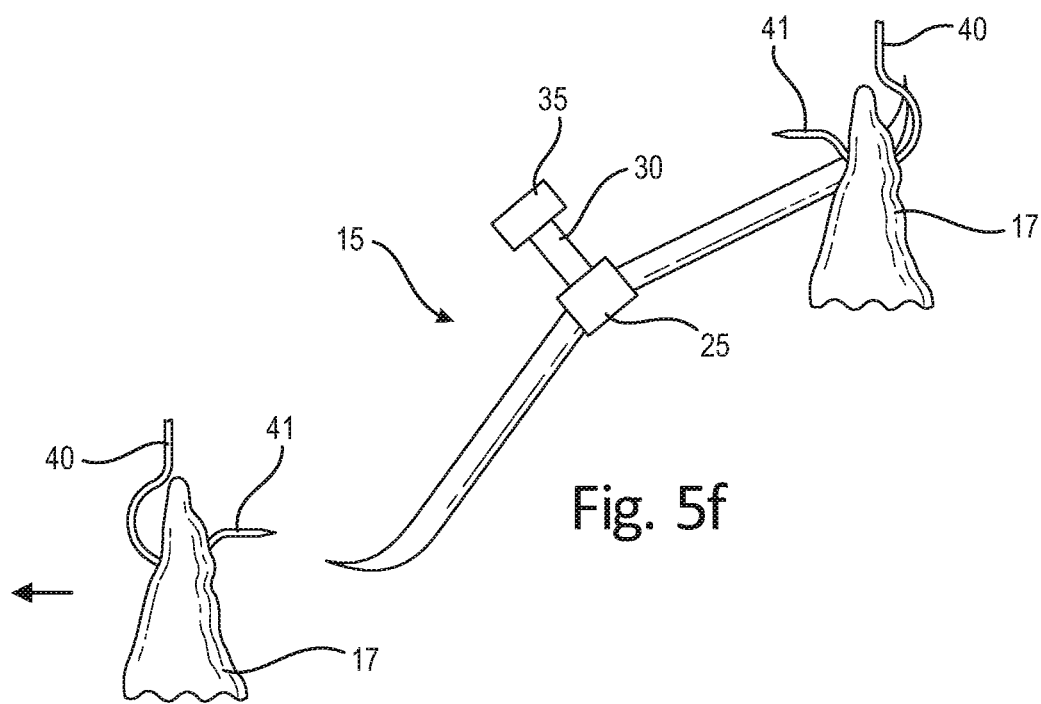

FIG. 5e shows a step when the free ends of the gambrel have been tilted, one free end downwards (the left free end in the Figure) and the other free end upwards (the right free end in the Figure). The weight of the carcass part 17 still fully rests on the individual single carriers 40. The leftmost carcass part 17 may now be completely removed from the lower free end of the gambrel, as is shown in FIG. 5f. This may be done by utilizing a tapered guide 70 (see FIGS. 11b and 11c which will be described below) to push the carcass part away from the gambrel and/or by the single carrier conveyor paths diverging outwards with respect to the gambrel conveyor.

Figure 5G:
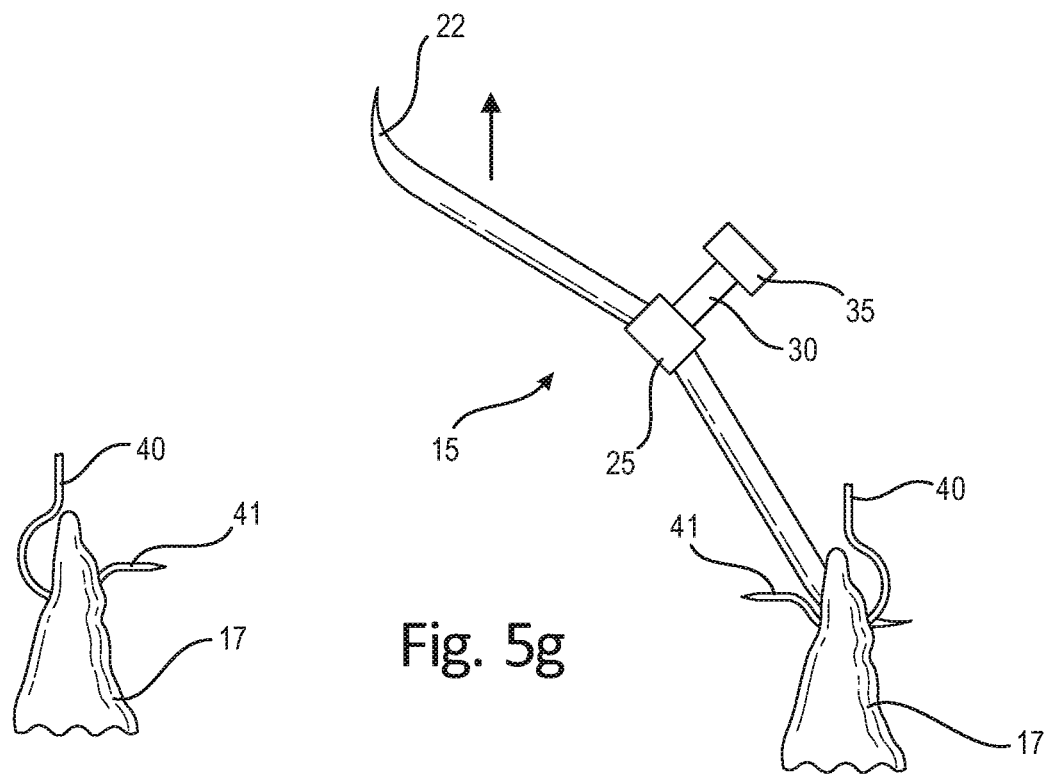
Figure 5H:
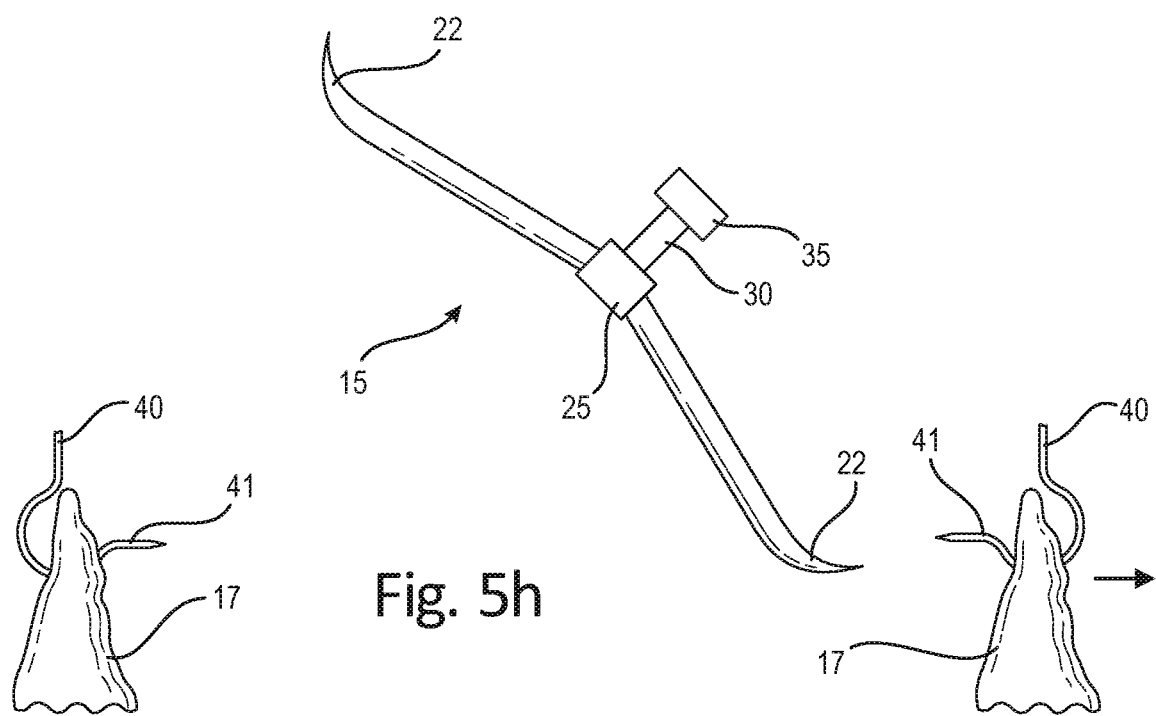
Figure 5I:
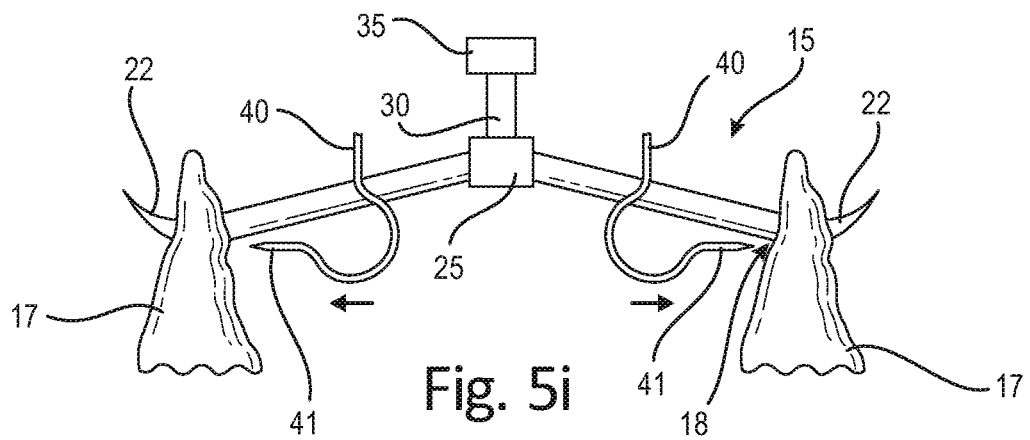
FIGS. 5i-m are schematic side views showing detailed steps of a gambrel to single carrier transfer according to a further embodiment of the invention, where the free end of the single hook approaches the carcass part from the same side as where the free end of the gambrel was inserted.
Figure 5J:
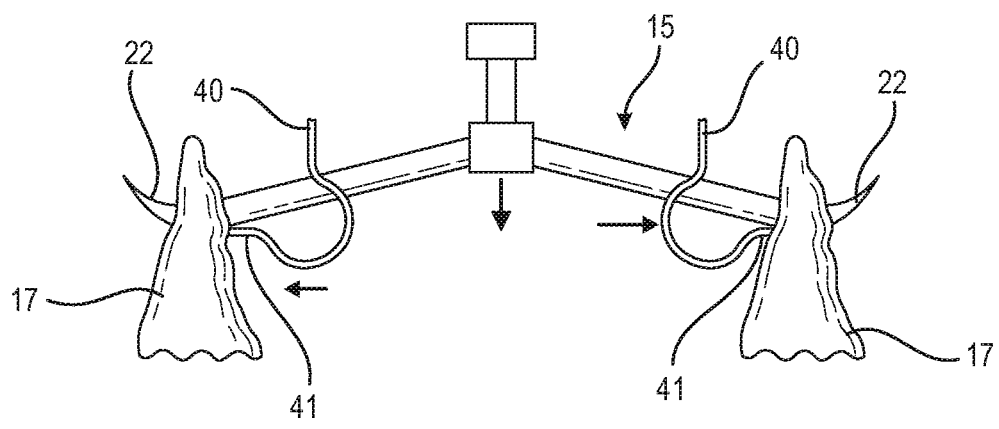
Figure 5K:
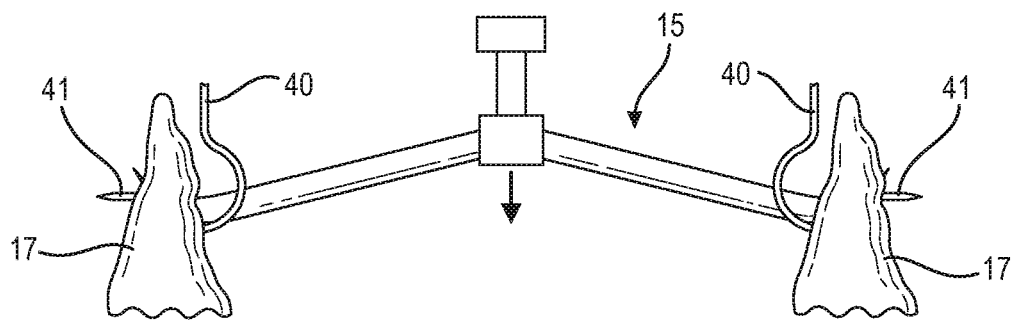
Figure 5L:
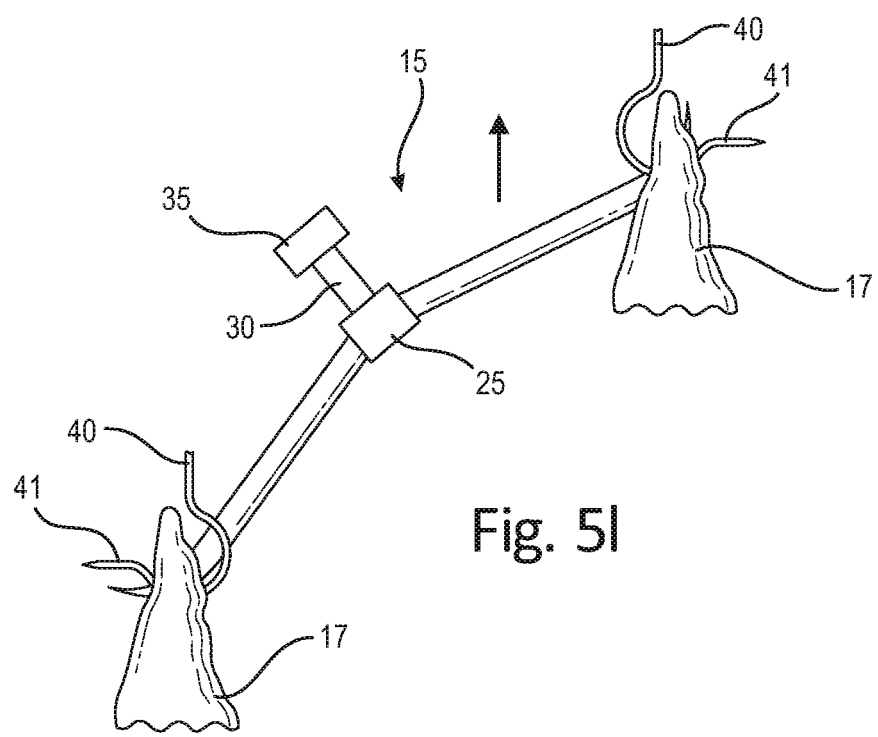
Figure 5M:
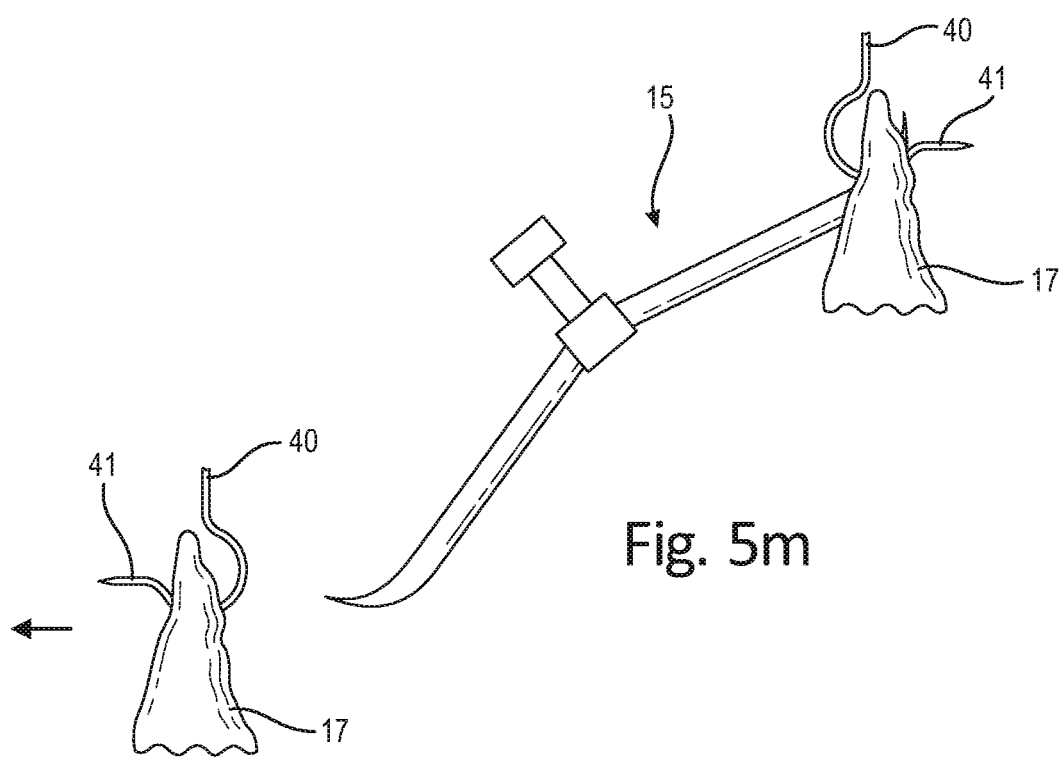

FIG. 5g shows a further step when the free ends of the gambrel have been tilted, one free end upwards (the left free end in the Figure, now free of its carcass part) and the other free end downwards (the right free end in the Figure, the only free end of the gambrel to carry a carcass part). The weight of the carcass part 17 still fully rests on the individual rightmost single carrier 40. The rightmost carcass part 17 may now be completely removed from the lower free end of the gambrel, as is shown in FIG. 5h. This may be done by utilizing a tapered guide 70 (see FIGS. 11b and 11c which will be described below) to push the carcass part away from the gambrel and/or by the single carrier conveyor paths diverging outwards with respect to the gambrel conveyor.

FIGS. 5i to 5m show the steps involved in de-gambreling carcass parts 17 from a gambrel 15 (first carrier) to a pair of single carriers 40 (second carrier) similar to what has been described for FIGS. 5a to 5h, with the difference that the free end of the single hook 41 is inserted in the same direction that the free end(s) 22 of the gambrel 15 were inserted into the openings 18 (see FIG. 15) in the legs of the carcass parts 17. The steps correspond to what has been shown for FIGS. 5a to 5h, except that some steps have been omitted since they are similar to the earlier shown steps.

A further embodiment is shown in FIGS. 11a to 11d and 12a to 12d. Here, a transfer of a carcass part 17 is made from one single carrier 15' (first carrier), of a first single carrier conveyor (similar to the two single carrier conveyors 13' and 13" as shown in FIGS. 1 to 4), to another single carrier 40 (second carrier), of a second single carrier conveyor. In FIGS. 11a to 11d, the carriers are similar, a Euro Hook variant with a longer tip portion 41, 41'. In FIGS. 12a to 12d, the carriers are one standard Euro Hook used as the first carrier, and a Euro Hook variant with a longer tip portion 41 used as the second carrier.

Figure 11A:
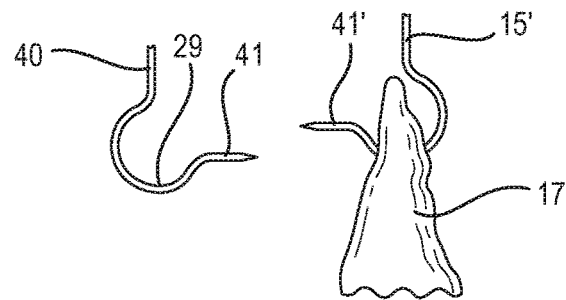
FIGS. 11a-d are schematic side views showing detailed steps of a single carrier to single carrier transfer according to an embodiment of the invention.
Figure 11B:
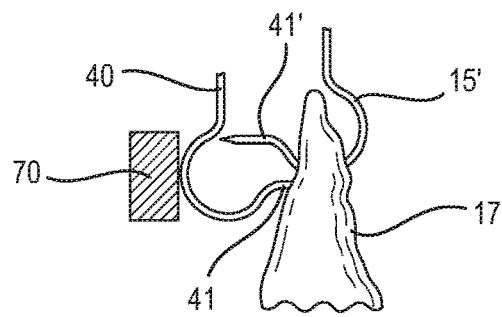
Figure 11C:
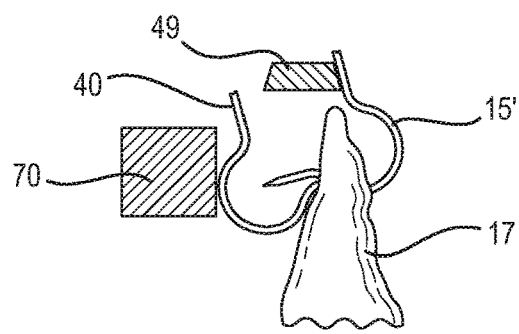

FIG. 11a shows an initial step of transfer from one single carrier to another single carrier according to an embodiment of the invention. The location of the tips 41', 41 of the respective single carriers 15', 40 are lined up in the transport direction of the single carriers. The lining up may take place by adjusting the speed of either or both of the first and second single carrier conveyors. The control system may incorporate a vision system (not shown) for detecting the position of the individual opening 18 (see FIG. 15) in the carcass part. In this case, the control system uses this position information to regulate the conveyor speeds. The bottom part 29' of the carrier 15' (first carrier), in which the leg part of the carcass part is resting, has a vertical position that is higher than the vertical position of the tip of the single carrier 40 (second carrier) and the horizontal distance between the bottom part and the tip may also be considerable.

In FIG. 11b is shown how the tip 41 of the second carrier 40 is inserted into the opening 18 by the use of a guide 70. The vertical distance between the tip 41 and the bottom part 29' of the first carrier 15' has diminished, but the tip 41 is still below the bottom part 29'. The vertical movements may be done by changing the conveyor paths in a vertical direction or by utilizing guides 45, 46, 47 and/or 48 (as shown in FIGS. 6a and 6b as will be described below) and/or by using a tapered guide 70, which displaces the second carrier 40 to the right in the figure as the first and second carriers travel along the transport direction. Care must be taken to compensate for the simultaneous displacement of the carriers in both vertical as well as horizontal planes. The full weight of the carcass part 17 is still resting on the first carrier 15'.

FIG. 11c shows how the transfer of the carcass part 17 is started by pressing the carcass part from the first carrier 15' towards the second carrier 40. A tilt guide 49 (see FIGS. 13a and 13b described earlier) may be used to angle one or both carriers perpendicularly with respect to the transport direction of each conveyor. This may alone or in combination with the tilt guide 49 be accomplished by using a carcass guide (not shown) acting on the carcass part directly. The result is the lowering of the bottom part 29' of the first carrier, and/or the raising of the tip 41 of the second carrier, so that the weight of the carcass part is gradually transferred to the second carrier. At the end of this step, the full weight of the carcass part rests on the second carrier.

Figure 11D:
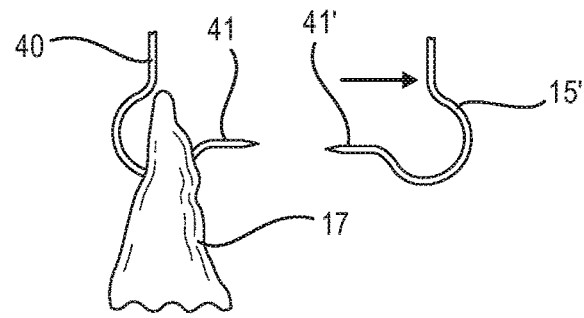
Figure 12A:
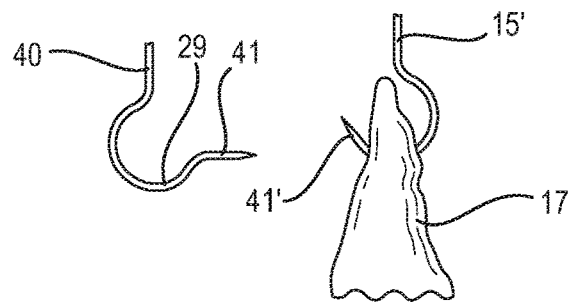
FIGS. 12a-d are schematic side views showing detailed steps of a single carrier to single carrier transfer according to an embodiment of the invention.
Figure 12B:
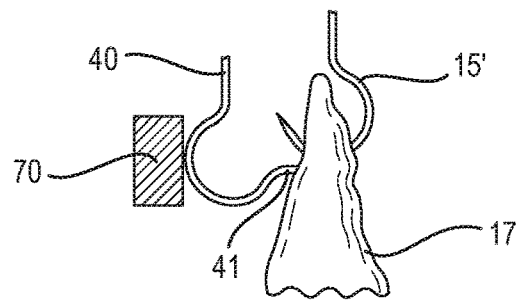
Figure 12C:
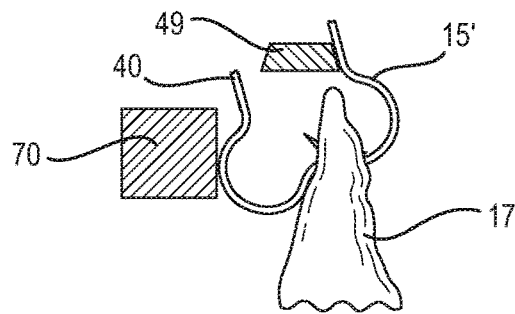
Figure 12D:
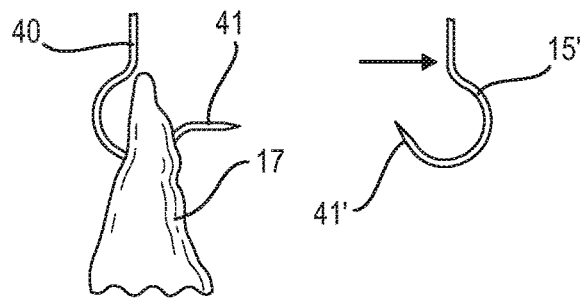
Figure 16:
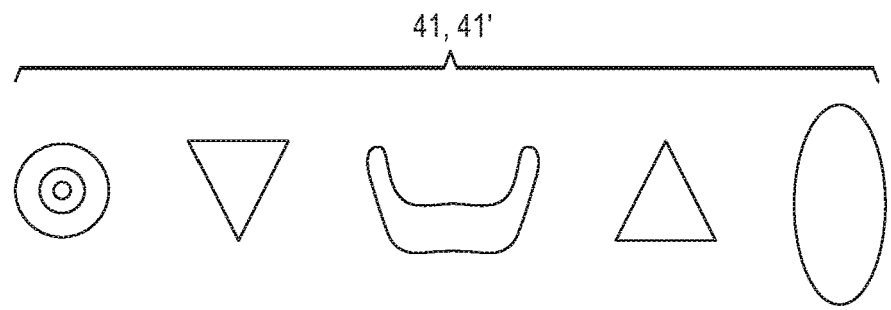
FIG. 16 is a schematic end view showing single hook tip end profiles according to embodiments of the invention.

In FIG. 11d is shown the step where the carcass part has been pushed to the bottom part 29 of the second carrier 40 and the first carrier 15' is completely removed from the opening 18 of the carcass part. FIG. 6d shows the tip 41 of the second carrier and the bottom part 29' of the first carrier being separated in the horizontal plane. The first and second conveyors may now continue on to separate goals.

In FIGS. 12a to 12d, the steps are identical to what has been described above for FIGS. 11a to 11d, except that the first carrier is a standard Euro Hook and the second carrier is a variation of the Euro Hook having an extended tip portion 41.

FIGS. 6a and 6b show embodiments of guide arrangements that may be used in all embodiments of the transfer system according to the invention. FIGS. 6a and 6b show guides used to stabilize, raise and/or tilt the gambrel 15. A first bottom guide 45, generally shaped to follow a bottom contour of the gambrel, may be used either to stabilize the gambrel from movement in a rotating direction about the gambrel conveying device 35 and/or to raise and/or tilt the gambrel free ends 22 in a vertical direction. Each free end may be lowered or raised, but the corresponding and opposite movement is made by the other free end when tilting the gambrel. A similar use may be made of second bottom guides 47 shown in FIG. 6b. A first top guide 46, shown in FIG. 6a, may be used to stabilize the gambrel from movement in a rotating direction about the gambrel conveying device 35. Similarly, a second top guide 48, shown in FIG. 6b, may be used to stabilize the gambrel from movement in a rotating direction about the gambrel conveying device 35. All of the bottom guides 45, 47 may have a profile in the travel direction of the gambrel. For example, the guide profile may be lower at an entrance portion of the guides and gradually be raised to a higher profile to push the gambrel upwards by tilting the gambrel backwards and upwards towards the gambrel conveying device 35. In this way, the vertical position of the free ends 22 of the gambrel may be varied with respect to the conveying device depending upon where the gambrel is situated along the profile of the guides.

Figure 17:
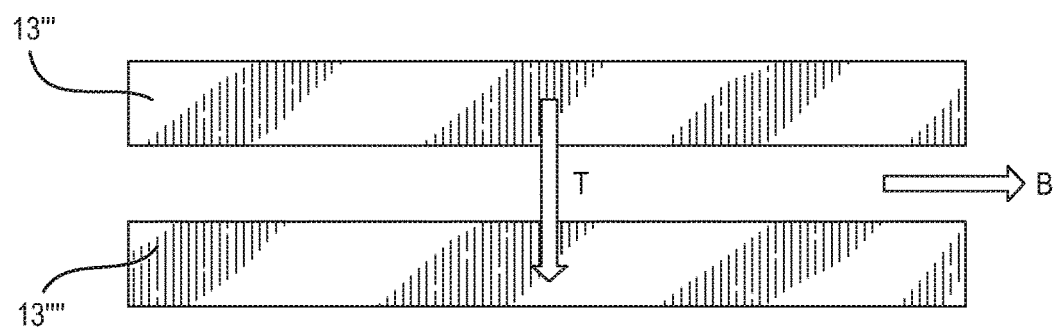
FIG. 17 is a schematic top view showing a transfer of carrier according to an embodiment of the invention, where carcass parts may be sorted into alternative processing lines.

FIG. 17 schematically illustrates how carcass parts transported in a transport direction B on a first single carrier conveyor transport device 13''' may be transferred in a transfer T to a second single carrier conveyor transport device 13'''' moving in the same transport direction B. Any of the single hook to single hook transfer embodiments described earlier may be used. To change the transport direction, a carousel type arrangement may be used (not shown).

The above description of possible embodiments of the present invention should not be interpreted as limiting the scope of the present invention. Factors such as cost, mechanical stability and weight of components will dictate what solution is chosen for each case.

The invention claimed is:

1. An overhang rail transport system comprising:
   a first carrier being transported by a first overhead conveyor in a transport direction and having a first carcass engaging portion, the first carrier being arranged to selectively carry a carcass part by engaging the carcass part with the first carcass engaging portion,
   a second carrier being transported by a second overhead conveyor and having a second carcass engaging portion, the second carrier being arranged to selectively carry a carcass part by engaging the carcass part with the second carcass engaging portion,
   a vertical aligning device to align the first carcass engaging portion and the second carcass engaging portion in a vertical direction,
   a horizontal aligning device to align the first carcass engaging portion and the second carcass engaging portion in a horizontal direction, so that both the first carcass engaging portion and the second carcass engaging portion simultaneously engage the carcass part,
   a tilting device to tilt the first carcass engaging portion downwards, so that the weight of the carcass part is gradually transferred from the first carcass engaging portion to the second carcass engaging portion, and
   a removing device to remove the first carcass engaging portion completely from engagement with the carcass part.

2. The overhang rail transport system according to claim 1, further comprising:
   a first processing section comprising multiple of spaced apart first carriers for conveying carcass parts of a four-legged slaughter animal, where each of the first carriers comprises, a free end designed to extend through an opening in a leg part of one of the carcass parts causing the carcass parts to be at least freely hanging,
   at least one second processing section comprising multiple spaced apart second carriers where each of the second carriers comprises a free end designed to engage with the leg part of one of the carcass parts causing the carcass part to be at least freely hanging,
   wherein the overhang rail transport system further comprises:
   a transfer zone positioned between the first processing section and the at least one second processing section,
   a control device for automatically controlling the movement of the first and the second carriers so that upon arrival at the transfer zone the first and the second carriers are synchronized in movement such that:
   the first carrier moves in a first direction carrying the carcass part through the opening in the leg part and at least one empty second carrier moving in a second direction meet with their respective free ends facing each other, the transfer zone being designed such that during movement of the first and the second carriers:
   the relative horizontal distance between the free end of the first carrier and the free end of the second carrier decreases until the second carrier engages with the carcass part, followed by
   the weight of the carcass part load being transferred from the first carrier to the second carrier.

3. The overhang rail system according to claim 1, wherein the free end of the second carrier is configured to extend through the opening in the leg part of the carcass part causing the carcass part to be at least freely hanging.

4. The overhang rail system according to claim 1, wherein the transfer zone is further designed so that upon arrival at the transfer zone the height level of the free end of the second carrier is below a height level of the free end of the first carrier such that the decrease in the relative position of the free ends causes the free end of the second carrier to penetrate into the opening at the leg part below the free end of the first carrier.

5. The overhang rail system according to claim 4, wherein the transfer zone is further designed so the relative height level distance between the free end of the first carrier and the free end of the second carrier changes until the height level of the free end of the second carrier is above the height level of the first carrier causing the weight transfer of the carcass part load to the second carrier.

6. The overhang rail system according to claim 1, further comprising a guiding device, subsequent to the transfer of the carcass part to the second carrier, to tilt the first carrier and guide the first carrier and/or the carcass part away from the second carrier resulting in that the second carrier being the sole carrier for the carcass part.

7. The overhang rail system according to claim 6, wherein the guiding device comprises an elongated guiding member arranged relative to the first and second carriers such that the elongated guiding member interacts with the first carrier and/or the carcass part while the first carrier moves in the first direction, the interaction forcing the first carcass engaging portion of the first carrier downwards.

8. The overhang rail system according to claim 6, wherein the guiding device comprises an elongated guiding member arranged relative to the first and second carriers such that the elongated guiding member interacts with the first carrier and/or the carcass part while the first carrier moves in the first direction, the interaction forcing an increase in the relative horizontal distance between the first carrier and the second carrier until a complete separation of the first carrier from the opening in the leg part.

9. The overhang rail system according to claim 5, wherein the first carrier is slideably attached to a first rail guide and the second carrier is slideably attached to a second rail guide,
   wherein the transfer zone is defined via the internal arrangement of the first and/or the second rail guide causing the change in the relative horizontal distance between the free end of the first carrier and of the free end of the second carrier.

10. The overhang rail system according to claim 5, wherein the transfer zone is further defined via the internal arrangement of the height level distance between first and/or the second rail guide causing the change in the relative height level distance between the free end of the first carrier and the free end of the second carrier.

11. The overhang rail system according to claim 1, wherein the first carrier comprises a gambrel like structure comprising free ends at its opposite ends, where each of the opposite ends carries a carcass part,
   wherein the at least one second processing section includes two second processing sections,
   wherein the synchronized movement occurs at the opposite ends of the gambrel where empty free ends of second carriers penetrate into the respective opening at the leg parts of the carcass parts.

12. The overhang rail system according to claim 1, wherein the first carrier comprises a hook, more specifically a Euro Hook.

13. The overhang rail system according to claim 1, wherein the first carrier is identical to the second carrier.

14. The overhang rail system according to claim 1, wherein the transfer zone further comprises a support guide such as a tapered guide to interact with a rear side of the first and/or the second shackle type while the second carrier engages with the carcass part and/or while the carcass part is removed from the first shackle and to the second shackle.

15. A method for transferring a carcass part from a first carrier to a second carrier, the first carrier being transported by a first overhead conveyor and having a first carcass engaging portion, the second carrier being transported by a second overhead conveyor and having a second carcass engaging portion, the method comprising the steps of:
   carrying a carcass part in the first carrier by engaging the carcass part with the first carcass engaging portion,
   vertically aligning the first carcass engaging portion and the second carcass engaging portion,
   horizontally aligning the first carcass engaging portion and the second carcass engaging portion, so that both the first carcass engaging portion and the second carcass engaging portion simultaneously engage the carcass part,
   tilting the first carcass engaging portion downwards, so that the weight of the carcass part is gradually transferred from the first carcass engaging portion to the second carcass engaging portion, and
   removing the first carcass engaging portion completely from engagement with the carcass part.

* * * * *